Aug. 20, 1929.   W. F. LEMMER   1,725,089
SAW GUIDE
Filed Jan. 19, 1927
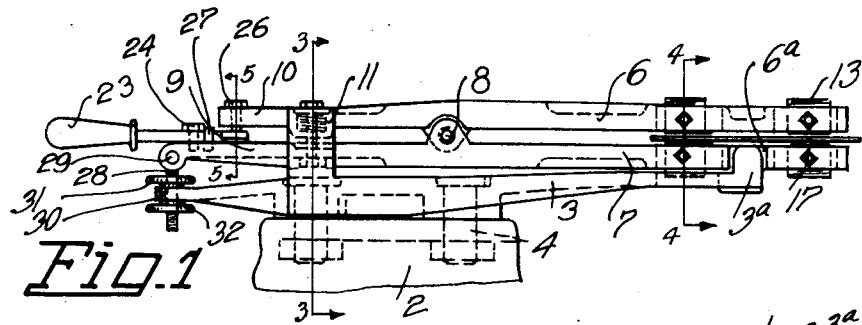
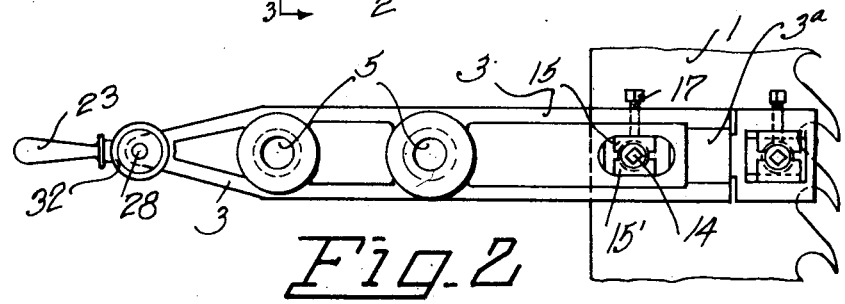
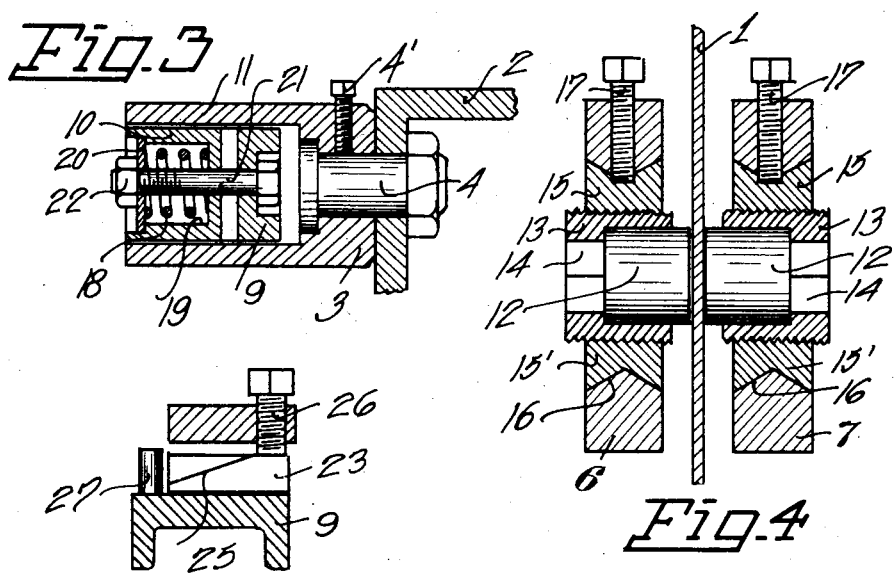
Inventor
William F. Lemmer
By Herbert E. Smith
Attorney Patented Aug. 20, 1929.

1,725,089

UNITED STATES PATENT OFFICE.

WILLIAM F. LEMMER, OF KOOTENAI, IDAHO, ASSIGNOR TO UNION IRON WORKS, OF SPOKANE, WASHINGTON.

SAW GUIDE.

Application filed January 19, 1927. Serial No. 162,040.

My present invention relates to improvements in saw guides of the type utilized in connection with band saws for the purpose of maintaining the operating or working flight of the band saw in its correct line or plane with respect to the timber or logs being sawed. The saw guide is of the pivotal, spring pressed type and its parts are combined and arranged, in such manner as to permit the guide to adapt itself to variations in the movement of the saw blade and yet at the same time co-act with the blade to prevent buckling of the saw and to prevent the saw cutting an angular kerf in the log or timber.

Manually controlled means are provided for opening the spring pressed jaws of the guide to permit releasing of a sliver of wood or other extraneous object that might get jammed in the guide, and manually adjustable means are also provided for bodily adjusting the guide with relation to its support and to the saw.

The invention consists in certain novel combinations and arrangements of parts as will hereinafter be more fully set forth and claimed.

In the accompanying drawings I have illustrated one complete example of the physical embodiment of my invention wherein the parts are combined and arranged according to one mode I have thus far devised for the practical application of the principles of my invention.

Figure 1 is a plan view of the guide showing the saw blade in section between a pair of pivoted spring pressed or resilient jaws of the guide.

Figure 2 is an edge view of the guide of Figure 1 showing also the saw blade, with the guide-support omitted for convenience of illustration.

Figure 3 is an enlarged, transverse sectional view at line 3—3 of Figure 1.

Figure 4 is an enlarged cross sectional view at line 4—4 of Figure 1 showing a pair of hard-wood friction heads in their relation to the saw blade.

Figure 5 is a transverse sectional view at line 5—5 of Figure 1 showing the cam action when the jaws are manually opened or released from the blade.

In the form of the invention illustrated in the drawings a portion 1 of a band saw is indicated, and the saw guide is supported from an angular support or frame member 2 located adjacent the saw in a convenient position. The guide as a whole includes an attaching plate 3, and bolts 4, having set bolts 4', are passed through the bolt holes 5 of the attaching plate for rigidly mounting the guide on the frame or support 2, through the use of the attaching plate.

The guide includes a pair of jaws 6 and 7, the former a spring pressed resilient jaw, and the latter a stationary jaw and these jaws are pivoted together at 8. The jaws are fashioned with lever ends 9 and 10 that are partly enclosed in a U-shaped yoke 11 of the attaching plate 3.

For frictional contact with the saw blade 1 I provide four friction-heads 12, arranged in spaced pairs at opposite sides of the blade, and preferably fashioned of round pieces of hard wood as lignum vitæ. These frictionheads for engagement with the opposite sides of the saw blade are carried in exteriorly threaded bushings 13, and each of these bushings is fashioned with a polygonal socket 14 for the reception of a tool by means of which the bushings may be adjusted in the respective split steel slide blocks 15 and 15' of the jaws 7 and 6. These slide blocks are adjustable longitudinally of the jaws and are each provided with a tongue-and-groove slide joint as 16 between the split blocks and the jaws. Set bolts 17 are provided for engagement with the upper sections of the slide blocks to hold them in adjusted position. Thus it will be apparent that the two pairs of round friction-heads 12 may be adjusted toward or from the saw blade by turning the bushings 13, and the pairs of friction heads may be adjusted relatively by sliding the split slide blocks to desired position and then tightening the set bolts or screws 17.

The opposed pairs of friction-heads are held in proper position at the sides of the saw blade by means of a compression spring 18 located in the socket 19 of the jaw lever 10, which spring bears against a washer 20 on the bolt 21. The spring is coiled about the bolt within the socket and a retaining nut 22 is threaded on the end of the bolt exterior of the washer. The compression of the spring may be varied by turning the nut and the spring tends to spread apart the jaws of the guide.

The jaws may be manually closed and positively retained in that position, by turning the cam lever 23 which is pivoted at 24 on the lever arm 9 of the saw guide. The lever is fashioned with a cam face 25 to coact with a set bolt 26 on the lever 10 of the saw guide, and it will be apparent that by turning the cam lever in the proper direction the jaw 6 may be turned toward the stationary jaw 7 the jaws are in position to guide a band saw. A stop pin 27 is carried on the lever arm 9 to prevent excessive movement of the cam lever 23. When the cam lever is turned as required, the spring 18 is permitted to draw the lever ends of the jaws together, thus opening the jaws at the opposite side of the pivot 8.

The jaw 7 and its integral lever arm 9, and the movable jaw, are adjustable with relation to the attaching plate 3 by the use of an eye bolt 28 hinged or pivoted at 29 to the lever arm 9 of the stationary jaw. This bolt is passed through an eye 30 on the end of the attaching plate, and at the sides of this eye are provided a pair of adjusting nuts 31 and 32 on the bolt. On the end of the attaching plate opposite to the two nuts is fashioned a head 3$^a$ that engages in a socket or recess 6$^a$ in the outer side of the jaw 7, and it will be apparent that this head and socket joint is used as the center of movement when the guide is adjusted by turning the two nuts 31 and 32 of the bolt 28.

Having thus fully described my invention, what I claim as new and desire to secure by Letters Patent is—

1. The combination with an attaching plate having a bolt eye at one end and a fulcrum head at the other end, of a saw guide having a fulcrum recess for said head, an eyebolt on the guide passing through said bolt eye, and adjusting nuts on said bolt at opposite sides of the bolt eye.

2. In a saw guide the combination with an attaching plate having a fulcrum head and a supporting yoke, of a pair of pivoted jaws in the yoke, lever arms on the jaws and resilient means between the jaws for opening the latter, one of said jaws having a recess for said head, and co-acting means comprising a bolt eye on the attaching plate, an eyebolt pivoted on one of the jaws and located in said bolt eye, and adjusting nuts on the eyebolt for adjusting the saw guide.

In testimony whereof I affix my signature.

WILLIAM F. LEMMER.